United States Patent
Armitage et al.

(10) Patent No.: US 8,280,328 B2
(45) Date of Patent: Oct. 2, 2012

(54) HIGH SPEED FREQUENCY DETECTOR

(75) Inventors: Adam Armitage, Broomhill (GB); John Michael Cliss, Stapleton (GB); Alan David Hart, Downend (GB); Duncan Christopher Frederick Levett, Bishopston (GB)

(73) Assignee: MBDA UK Limited, Hertfordshire (GB)

( * ) Notice: Subject to any disclaimer, the term of this patent is extended or adjusted under 35 U.S.C. 154(b) by 650 days.

(21) Appl. No.: 12/513,621

(22) PCT Filed: Mar. 20, 2009

(86) PCT No.: PCT/GB2009/050263
§ 371 (c)(1),
(2), (4) Date: May 5, 2009

(87) PCT Pub. No.: WO2009/122194
PCT Pub. Date: Oct. 8, 2009

(65) Prior Publication Data
US 2011/0053538 A1 Mar. 3, 2011

(30) Foreign Application Priority Data
Mar. 31, 2008 (GB) .................................. 0805839.8

(51) Int. Cl.
H04B 17/00 (2006.01)
(52) U.S. Cl. .................................................. 455/226.1
(58) Field of Classification Search .................. None
See application file for complete search history.

(56) References Cited

U.S. PATENT DOCUMENTS
4,062,020 A 12/1977 Berglund
(Continued)

FOREIGN PATENT DOCUMENTS
JP 53-122463 A 10/1978
(Continued)

OTHER PUBLICATIONS

Pui-In Mak et al., "Transceiver Architecture Selection: Review, State-of-the-Art Survey and Case Study" IEEE Circuits and Systems Magazine, IEEE Service Center, New York, NY, US, vol. 7, No. 2, Apr. 1, 2007, pp. 6-25.

(Continued)

Primary Examiner — Lincoln Donovan
Assistant Examiner — Khareem E Almo
(74) Attorney, Agent, or Firm — Buchanan Ingersoll & Rooney PC

(57) ABSTRACT

A sensor (10) for detecting an incident RF signal having a carrier frequency, and for estimating said carrier frequency, comprises a plurality of filters (70-73), each allowing passage of signals over a different band of frequencies from the band of frequencies over which passage of signals is allowed by the others of the plurality of filters (70-73), and a plurality of detectors (80-83). Each filter (70-73) is associated with at least one of the plurality of detectors (80-83), and said at least one detector (80-83) is arranged in use to generate an output signal if the incident RF signal results in a signal in the band of frequencies passed by the filter (70-73) with which the detector (80-83) is associated. Generation of the output signal by the detector (80-83) indicates in which of the frequency bands the incident RF signal has been detected. Between arrival of the incident RF signal at the sensor (10) and generation of the output signal indicating in which of the frequency bands the incident RF signal has been detected, there is a delay of not more than 1 microsecond.

21 Claims, 2 Drawing Sheets

U.S. PATENT DOCUMENTS

| | | | |
|---|---|---|---|
| 5,465,410 A * | 11/1995 | Hiben et al. | 455/266 |
| 6,477,214 B1 * | 11/2002 | Fowler et al. | 375/350 |
| 7,369,836 B2 * | 5/2008 | Suganuma | 455/306 |
| 7,529,328 B2 * | 5/2009 | Ryu | 375/350 |
| 2005/0077889 A1 | 4/2005 | Toporski et al. | |
| 2005/0286666 A1 | 12/2005 | Ryu | |

FOREIGN PATENT DOCUMENTS

| | | |
|---|---|---|
| JP | 57-106872 A | 7/1982 |
| JP | 04-348282 | 12/1992 |
| JP | 2006-292710 A | 10/2006 |

OTHER PUBLICATIONS

Notification of Transmittal of the International Preliminary Report on Patentability (Forms PCT/IPEA/416 and PCT/IPEA/409) issued in the corresponding International Application No. PCT/GB2009/050263 dated Apr. 13, 2010.

United Kingdom Search Report for GB 0805839.8, dated Oct. 28, 2008.

* cited by examiner

HIGH SPEED FREQUENCY DETECTOR

FIELD OF THE INVENTION

This invention relates to the field of frequency detectors. More particularly, the invention relates to a frequency detector for determining the carrier frequency of an incident radio-frequency (RF) signal over a wide operating bandwidth. Still more particularly, the invention relates to a sensor for rapidly determining the frequency of an incident RF signal. Still more particularly, the invention relates to a frequency detector with a high input signal dynamic range.

BACKGROUND ART

Various situations exist in which it is desirable to rapidly determine the frequency of an incident RF signal, for example in order to determine what subsequent processing of the signal is appropriate.

In frequency-agile data links, for example, a data signal is transmitted using a sequence of changing carrier frequencies, in order to increase the rate of transmission of data and to reduce interference with other signals. Where the sequence to be used is not known, e.g. because it is determined dynamically in response to environmental conditions or the presence of signals on other wavelengths, optimal performance may necessitate detection of the carrier frequency in order to tune detector signal-processing circuits to that wavelength.

Similarly, frequency-hopping spread spectrum techniques are used in some applications for enhanced protection against interception. A signal that jumps rapidly between different frequencies is difficult to intercept, as it is often hard to distinguish from background noise. In such a system, it again can be necessary to detect the incident frequency and to tune the receiver circuit appropriately.

To take another example, the characteristics of active high impedance surfaces (HISs) offer advantages in many microwave circuit, antenna and defence applications. In such applications, it is desirable to detect rapidly the frequency of the incident radiation, for example, so that a varactor bias voltage can be determined and quickly applied, in order to tune the surface to an appropriate frequency (for example, in order to tune the surface so that there is a resonance at the incident frequency).

It has been found that commercially available RF frequency detectors typically have inadequate response times or are unable to handle the wide range of frequencies encountered in many applications (typical vector network analysers can estimate frequencies in a few milliseconds). Moreover, many detectors are bulky and not appropriate for situations (e.g. airborne applications) where component footprint, volume and mass are crucial.

Known high-speed frequency sensors typically sweep rapidly across a range of frequencies in which it is expected that the incident RF signal will be present. Typical sweep rates are dependent on the bandwidth of the swept filter (i.e. the resolution of the sensor): the narrower the bandwidth the slower the sweep frequency. A rule of thumb is that the sweep frequency is $df/dt = B^2/2.5$ where B is the filter bandwidth. So for a 50 MHz filter bandwidth the sweep rate could be expected to be of the order of 1 GHz/µs.

The maximum speed of detection of an incident signal can be expected to be approximately equal to the time it takes to complete one sweep of the range of frequencies of interest, as, if the signal arrives at a frequency just after the detector has swept past that frequency, the signal will not be detected until substantially a whole sweep has been completed, and the relevant frequency is reached again. Such a system, using a 50 MHz bandwidth filter, would take 1 microsecond to perform a 1 GHz sweep, using a Gaussian filter profile, but there is a trade off between propagation delay and rate of fall off of the filter response at the band edge, and to achieve a rectangular filter profile would necessitate using a narrow filter and thus a longer sweep time.

Another prior-art technique is to digitise the incident signal data continuously in time, and then to perform a rolling-window Fast Fourier Transform (FFT) on the data. Nyquist theory predicts that to achieve a 1 GHz band with 50 MHz resolution, the data sample rate would need to be at least 2 GHz and the rolling window would need to be at least 20 ns wide. Although in principle this technique offers a good theoretical performance, several significant problems must be faced in practice. First, the computing overhead will significantly increase the propagation delay. Second, 2 GHz analogue-to-digital converters (ADCs) are not readily available. Third, the number of digital bits available with current 2 GHz ADCs is not sufficient to achieve a high dynamic range, with at best 30 dB achieved using this technique and currently available hardware.

Another well-known approach is the 'frequency discriminator' technique, in which a signal is passed through two paths of different lengths, and the phases of the two output signals are compared. The path length difference can be tailored to give a meaningful one-to-one relationship between phase and frequency over the desired operating range. In a typical prior-art implementation, an IQ mixer is employed to give output voltages indicative of the sine and cosine of the phase difference between the two paths. Twin ADCs are used to digitise those signals (the ADCs can run at a frequency equal to the desired bandwidth, i.e. 50 MHz, and electronics operating at that frequency is much more readily available than for the 2 GHz example given above). A processor converts that data into a signal which represents the input RF frequency.

There are several disadvantages with this approach. First, the approach gets more difficult as the total operation frequency band increases, as the path length difference must increase. Second, temperature effects change the delay length and have an impact on the accuracy of the conversion. Third, the approach only functions for one incident RF frequency; signals comprising more than one frequency can result in incorrect readings, as the discriminator can generate an output that is the mean of the two frequencies.

In some applications the performance of prior-art detectors is inadequate, for example where very short RF pulses are to be detected (of the order of a few tens or hundreds of microseconds), the operational frequency is large, a high dynamic range is required, and robustness to environmental changes (e.g. temperature changes) is desirable. It may be particularly desirable to detect a pulse before a substantial part of it has been incident on the detector, for example within a few hundred nanoseconds of the pulse arriving. In some applications, it is desirable to detect the pulse's carrier frequency as or very shortly after the leading edge of the pulse is incident on the detector. For such leading-edge detection, response times of a few tens of nanoseconds are desirable. We are not aware of any frequency sensors in the known art that can detect at high speeds the frequency of incident RF signals.

There is a need for a low-cost, rapid-response frequency detector capable of handling a wide range of RF frequencies.

DISCLOSURE OF THE INVENTION

A first aspect of the invention provides a sensor for detecting an incident RF signal having a carrier frequency, and for estimating said carrier frequency, the sensor comprising:

(i) a plurality of filters, each allowing passage of signals over a different band of frequencies from the band of frequencies over which passage of signals is allowed by the others of the plurality of filters; and (ii) a plurality of detectors;

wherein each filter is associated with at least one of the plurality of detectors, and said at least one detector is arranged in use to generate an output signal if the incident RF signal results in a signal in the band of frequencies passed by the filter with which the detector is associated;

wherein generation of the output signal by the detector indicates in which of the frequency bands the incident RF signal has been detected; and wherein between arrival of the incident RF signal at the sensor and generation of the output signal indicating in which of the frequency bands the incident RF signal has been detected, there is a delay of not more than 1 microsecond.

The sensor may be used in applications where rapid detection of the frequency of an incoming signal is required, and is especially useful where the frequency need not be determined precisely. For example, in some applications, high-impedance surface boards require drive signals which depend on the frequency of the incident radiation, but determination of the RF frequency to within 50 MHz is sufficient for correct operation.

A reason for prior-art frequency detectors being relatively slow is that they typically attempt to identify the frequency of incident RF radiation to a high precision. A higher frequency resolution typically leads to a higher response time. However, in some applications a relatively low resolution of the incident frequency is acceptable. In the sensor according to the invention, the incident RF signal is distributed across the plurality of filters, each of which allows passage of a different range of frequencies, and so the signal is only passed by the filter that passes the relevant frequency. The resolution of the sensor therefore depends on the number of filters used and the detection bandwidth of the sensor (e.g. 10 identical filters together covering an operational bandwidth of 1 GHz, and each having a bandwidth of 100 MHz would identify the frequency of the carrier frequency of the incident RF signal to within ±50 MHz). Although very high frequency resolution over a large bandwidth would therefore require a very large number of filters (which may be commercially undesirable) using a relatively small number of filters can provide a relatively low resolution that is nevertheless acceptable in some applications.

Although the preceding discussion assumes a single carrier frequency, some incident signals may have a bandwidth sufficiently broad to straddle two adjacent filter passbands, in which case an output signal would be generated from the corresponding two of the detectors. Similarly, the system also offers the ability to detect multiple simultaneous illuminating RF frequencies and to discriminate between them (within the resolution limits arising from the bandwidths of the filter passbands). The sensor may also detect complex waveforms and enable an estimation of the RF frequency components making up that waveform, again within the discrimination capability of the system; thus, the sensor may offer a coarse analysis of the spectrum of the incident waveform, by indicating the proportion of incident energy in each filter's passband.

The bands of frequencies over which the filters allow passage of signals may be distinct from each other; alternatively, two or more of the bands may overlap. When the bands overlap, an output signal may be generated from more than one detector, indicating that the carrier frequency of the incident signal is a frequency within the overlap of the bands.

The sensor may offer nearly instantaneous frequency determination. We have found that the biggest contribution to the overall delay is typically in the approach to determining which signal has the greater intensity. Delays through the filters are largely limited by Fourier theory. Theoretically it is possible to estimate the RF carrier frequency to an accuracy of $\Delta f$ within a period of $1/(\Delta f)$; for example, where $\Delta f$ corresponds to 50 MHz, it is theoretically possible to estimate the frequency within 20 ns. Preferably the delay is not more than 750 ns, not more than 500 ns, not more than 300 ns, not more than 200 ns, or not more than 100 ns. Preferably, the plurality of filters each has a bandpass width (and hence a frequency discrimination of $\Delta f$) and the delay is approximately $1/\Delta f$ (the theoretical minimum). Preferably it exceeds that value by not more than 50%, more preferably not more than 25%, still more preferably not more than 10%. Preferably, the filters offer a substantially rectangular filter profile, with a rapid fall-off at the filter edge.

The sensor may be arranged to be able to detect the carrier frequency of an RF signal that is greater than 100 MHz. The carrier signal may be greater than 300 MHz, greater than 500 MHz, greater than 1 GHz, greater than 2 GHz, greater than 5 GHz or greater than 10 GHz. The carrier frequency may be less than 4 GHz, less than 5 GHz, less than 10 GHz, less than 30 GHz, less than 50 GHz, or less than 100 GHz. For example, the carrier frequency may be in the range 2 GHz to 5 GHz.

The detectors may be log detectors; that is, the output signal may be proportional to the log base 10 of the input RF signal intensity. That gives the system high intensity dynamic range; for example, the intensity dynamic range may be greater than 40 dB, greater than 50 dB, greater than 60 dB or even greater than 70 dB (a dynamic range of 70 dB is equivalent to 12 bit resolution on an ADC approach).

The sensor may further comprise an antenna for receiving said RF signal, upon which said RF signal is incident.

The sensor may further comprise a buffer amplifier for amplifying the incident RF signal, connected between the antenna and the plurality of filters.

The sensor may further comprise a coarse RF bandpass filter allowing passage of RF signals over a band of frequencies comprising the bands of frequencies passed by the plurality of filters.

The sensor may further comprise a local oscillator arranged to provide a RF signal and a mixer, arranged upstream of the plurality of filters, wherein the mixer mixes the incident RF signal with the RF signal from the local oscillator to provide a downconverted signal to the plurality of filters.

A particular advantage of the invention is that the operating bandwidth of the detector may be extended simply by employing a further bank or banks of bandpass filters and detectors. Thus, the sensor may further comprise a second plurality of filters, each allowing passage of signals over a different band of frequencies from the band of frequencies over which passage of signals is allowed by the others of the second plurality of filters, the passbands of the second plurality of filters being different from those of the first plurality of filters, each filter being associated with a detector that generates an output signal if the incident RF signal results in a signal in the band of frequencies passed by the filter with which the detector is associated.

The sensor may further comprise a second coarse RF bandpass filter, allowing passage of RF signals over a band of frequencies comprising the bands of frequencies passed by the second plurality of filters.

The sensor may further comprise a second local oscillator arranged to provide a RF signal and a second mixer, arranged upstream of the second plurality of filters, wherein the second mixer mixes the incident RF signal with the RF signal from the second local oscillator to provide a downconverted signal to the second plurality of filters, the RF signal provided by the second local oscillator being different from the RF signal provided by the first local oscillator.

The sensor may further comprise at least one further set of a plurality of filters and associated detectors, a coarse RF bandpass filter, a local oscillator and a mixer, each arranged substantially as in the first and second sets described above, each set being arranged to detect the incident RF signal over a different range of frequencies.

The mixer, local oscillator, plurality of filters and detectors may form a unit. Each unit may be identical in hardware, with the local oscillator being programmable in software to operate at the desired frequency. That arrangement potentially reduces the costs of the system by allowing mass production.

At least some example embodiments of the invention may thus offer a system capable of providing continuous near-real-time frequency estimates. In at least some example embodiments, the system is capable of responding to multiple simultaneous input RF signals and providing estimates of the relative levels of the multiple input RF signals. The operational bandwidth of the system may be extendable by addition of further basic modules in parallel. The design may incorporate a high proportion of replicated modules. The design may be realisable using commercially available components which may result in it being inexpensive, and compact, with low power consumption.

A second aspect of the invention provides a system comprising an active high-impedance surface and a sensor according to the first aspect of the invention.

The system may be, or may be included in or on, a vehicle.

A third aspect of the invention provides a communications system including a sensor according to the first aspect of the invention.

A fourth aspect of the invention provides a method of detecting an RF signal and estimating the signal's carrier frequency, the method comprising monitoring for the RF signal with a sensor simultaneously in each of a plurality of frequency bands and, upon detection of the RF signal in one of the monitored frequency bands, generating an output signal indicating in which of the frequency bands the RF signal has been detected, wherein between arrival of the RF signal at the sensor and generation of the output signal indicating in which of the frequency bands the RF signal has been detected, there is a delay of not more than 1 microsecond. It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Embodiments of the invention will now be described, by way of example only, with reference to the accompanying drawings, of which.

DETAILED DESCRIPTION

In the example embodiments of the present invention, a frequency-binning approach is implemented.

Figure 1:
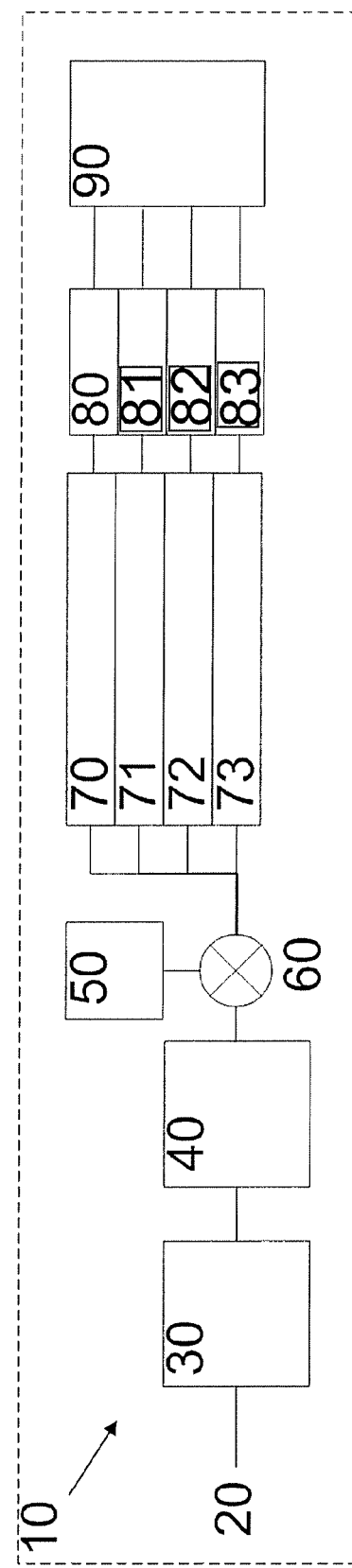
FIG. 1 shows a high-speed frequency sensor in accordance with a first example embodiment of the invention.

The first example embodiment, shown in FIG. 1, is a sensor 10 for detecting an incident RF signal having a carrier frequency in the range 3.0 GHz to 3.2 GHz.

An incident RF signal 20 is received by an antenna (not shown) and input to the system 10 via a buffer amplifier 30. The buffer amplifier 30 provides 20 dB gain over the operating RF frequency band of system 10. The amplified RF signal then passes into bandpass filter 40, where it is filtered to reject frequencies outside the band of interest (thus, in this example, the filter pass band covers 3.0 GHz to 3.2 GHz).

The next stage comprises a local oscillator 50 and a mixer 60. Mixer 60 mixes the filtered RF signal with a signal from the local oscillator 50, in a heterodyne process. In this example, the local oscillator 50 is fixed at 2.7 GHz so that the output from the mixer covers the range 300 MHz to 500 MHz. In principle, any local oscillator frequency can be chosen to control the heterodyned frequency band. The local oscillator frequency can be varied to vary the frequency range. The functioning of the mixer and local oscillator determine the limits that these can operate over. In principle, the operating range can vary anywhere from 300 MHz up to the limits of mixer technology, which can be greater than 80 GHz.

The heterodyned signal (300 MHz to 500 MHz) is then split in a power divider and passes through a bank of bandpass filters 70-73; the signal is split into N identical (i.e. equal in amplitude and phase) signals (in this example N=4). The output ports of the power divider are isolated so that impedance mismatches and power leakages are minimised. In general, each of the N signals are simultaneously applied to one of N band-pass filters, each having a predetermined bandwidth and being arranged to pass a different frequency sub-band (frequency bin). In the current example the filters 70-73 have 50 MHz pass bands around a series of centre frequencies each separated by 50 MHz (that is, filter 70 passes signals having a frequency between 300 MHz and 350 MHz, filter 71 passes signals having a frequency between 350 MHz and 400 MHz, filter 72 passes signals having a frequency between 400 MHz and 450 MHz, and filter 73 passes signals having a frequency between 450 MHz and 500 MHz). Thus each of the plurality of filters 70-73 allows passage of signals over a different band of frequencies from the band of frequencies over which passage of signals is allowed by the others of the plurality of filters.

As a result of the divided signals being applied simultaneously to each of the band-pass filters 70-73 or frequency bins, the filter having a bandpass corresponding to the frequency of the incident radiation will produce an output signal. The output signal from the triggered filter is fed to the diode detector associated with that filter. Detectors 80 to 83, in this case with logarithmic response, are associated with filters 70 to 73 (respectively). Detectors 80 to 83 generate an output signal if the incident RF signal results in a signal in the band of frequencies passed by the filter 70 to 73 with which the detector 80 to 83 is associated. In this example, detectors 80 to 83 do that by monitoring the outputs from their respective filters 70 to 73 and providing an output signal in the form of a voltage proportional to the amplitude in dB of output of the relevant filter 70-73. Thus generation of the output signal by the detector 80 to 83 indicates in which of the frequency bands the incident RF signal has been detected. Use of logarithmic detectors provides a good intensity dynamic range: in this example, the system is capable of dealing with signals which differ in magnitude by 70 dB.

The band centre delay of the filters 70-73 is 19 ns, which is very close to Fourier limited.

In one example application, the voltage produced by the triggered detector is input to a bias voltage generator network which is arranged to produce the correct bias voltage for a high impedance surface.

An advantage of offsetting the local oscillator 50 from the operating frequency of the system 10 (i.e. the centre frequency of bandpass filter 40) is that it allows the use of bandpass filters 70-73 having passbands centred in the few 100 MHz region. Commercial filters in that region are lightweight, relatively inexpensive and readily available (a suitable commercial filter is the SMD Lark Engineering MS325-50-4CC 50 MHz 4-stage band pass filter).

The frequency-binning approach has the particular advantage that is allows the operational frequency range of system 10 to be extended by the incorporation of additional modules in parallel. A few additional components are necessary in this approach but all are readily available commercially.

Figure 2:
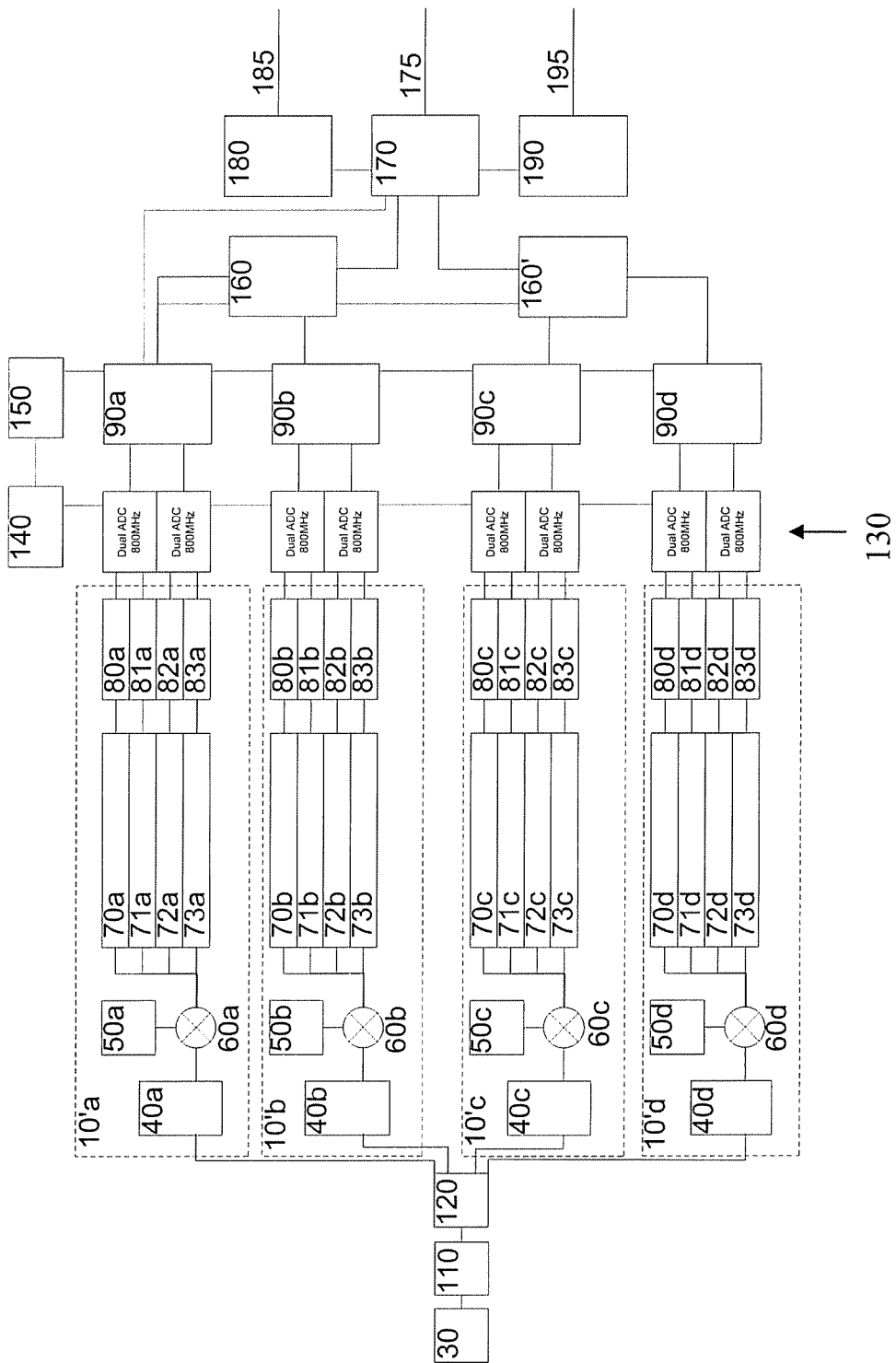
FIG. 2 shows a second high-speed frequency sensor in accordance with a second example embodiment of the invention.

FIG. 2 shows a second example embodiment of the invention, being a system 100 operating over the range 2.6 GHz to 3.4 GHz using four modules 10'a-d operating in parallel. Each module 10'a-d operates in a similar way to the system 10 of FIG. 1. In FIG. 2, the same (or similar) reference numerals are used to describe components corresponding to like-numbered components in FIG. 1. The system 100 incorporates some additional components to coordinate the operation of the four modules 10'a-d. The additional components and their functions are described below.

After amplification in the 20 dB gain amplifier 30, the RF input signal first passes through an isolator 110, to prevent any out-of-band RF reflected from the bandpass filters 40a-d from entering the output of amplifier 30.

The input signal is next input to a multi-port power divider 120. The number of output ports depends on the required operational bandwidth and the frequency resolution. In this example the operational frequency band is from 2.6 to 3.4 GHz which with a frequency resolution of 50 MHz requires sixteen filter channels. That is achieved by further providing second, third and fourth pluralities of filters, in this example by combining four of the four channel modules 10'a-d in parallel. Each of the four channel modules 10'a-d is identical. The increased operational frequency coverage is achieved by offsetting each of the heterodyne processes by 200 MHz. This is simply achieved by employing offset local oscillator frequencies in local oscillators 50a-d. Hence the system 100 comprises four very similar channels with frequency offset achieved in the mixers 60a-d.

In this example, additional functionality is incorporated following filters 70a-d to 73a-d and log detectors 80a-d to 83a-d. This additional functionality converts the analogue output from the log detector 80a-d to 83a-d to digital data to allow subsequent data processing. This aspect of the system depends on its overall purpose and is specific to an application.

Specifically, the outputs from the log detector 80a-d to 83a-d are converted to digital signals in dual analogue-digital converts (ADCs) 130, operating at an 800 MHz clock speed from clock 140. Clock 140 has such a high clock speed in order to reduce propagation delay through the ADC.

Outputs from the ADCs 130 are further combined in four decoders 90a-d, one associated with each module 10'a-d, and further combined in two further cascaded stages, first in decoders 160, 160' and then in decoder 170. All decoders 90a-d, 160, 160' and 170 are driven by clock 150 at 50 MHz. Decoder 170 provides a 4-bit RF frequency digital output signal 175, a second copy of that signal which is converted in a digital-analogue converter 190 into an analogue RF frequency output signal 195, and a third copy of the signal which passes into a threshold trigger circuit 180, which generates a Boolean RF detection signal 185 if the detected signal exceeds a pre-selected threshold strength.

All components required to implement the example systems 10 and 100 are commercially available.

Table 1 identifies example commercially available components for the system.

TABLE 1

| Example Commercially Available Components | |
|---|---|
| Amplifier | Generic SMA RF amp (e.g. Miteq) |
| Isolator | Generic SMA RF isolator (e.g. Ditom/Narda) |
| 4 port splitter | Generic SMA splitter ie Narda |
| 200 MHz filter 2.7 GHz centre | 200 MHz 7-stage band pass filter - SMD Lark Engineering MS2700-200-7CC, |
| 200 MHz filter 2.9 GHz centre | 200 MHz 7-stage band pass filter - SMD Lark Engineering MS2900-200-7CC |
| 200 MHz filter 3.1 GHz centre | 200 MHz 7-stage band pass filter - SMD Lark Engineering MS3100-200-7CC |
| 200 MHz filter 3.3 GHz centre | 200 MHz 7-stage band pass filter- SMD Lark Engineering MS3300-2007CC |
| LO | Generic oscillator SMD Hittite or Narda |
| Mixer | Generic RF mixer SMD Hittite |
| 50 MHz filter 325 CF | 50 MHz 4-stage band pass filter - SMD Lark Engineering MS325-50-4CC |
| 50 MHz filter 375 CF | 50 MHz 4-stage band pass filter - SMD Lark Engineering MS375-50-4CC |
| 50 MHz filter 425 CF | 50 MHz 4-stage band pass filter - SMD Lark Engineering MS425-50-4CC |
| 50 MHz filter 475 CF | 50 MHz 4-stage band pass filter - SMD Lark Engineering MS475-50-4CC |
| Log detector | 70 dB log detector 1-8 GHz - SMD MMIC Hittite |
| Dual ADC | MAX105 - Maxim 800 MHz dual 6-bit ADC SMD |
| EPROM | Cypress CY7C261 8k × 8 bit EPROM 20 ns access time |

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A sensor for detecting an incident RF signal having a carrier frequency, and for estimating said carrier frequency, the sensor comprising:
   (i) a plurality of filters, each allowing passage of signals over a different band of frequencies from the band of frequencies over which passage of signals is allowed by the others of the plurality of filters; and
   (ii) a plurality of detectors;
   wherein each filter is associated with at least one of the plurality of detectors, and said at least one detector is arranged in use to generate an output signal if the incident RF signal results in a signal in the band of frequencies passed by the filter with which the detector is associated;

wherein generation of the output signal by the detector indicates in which of the frequency bands the incident RF signal has been detected; and wherein each of the plurality of filters has a bandpass width of more than 1.5 MHz such that, between arrival of the incident RF signal at the sensor and generation of the output signal indicating in which of the frequency bands the incident RF signal has been detected, there is a delay of not more than 1 microsecond.

2. The sensor as claimed in claim 1, further comprising an antenna for receiving said RF signal.

3. The sensor as claimed in claim 2 further comprising a buffer amplifier for amplifying the incident RF signal, connected between the antenna and the plurality of filters.

4. The sensor as claimed in claim 1, further comprising a coarse RF bandpass filter allowing passage of RF signals over a band of frequencies comprising the bands of frequencies passed by the plurality of filters.

5. The sensor as claimed in claim 1 further comprising a local oscillator arranged to provide an RF signal and a mixer, arranged upstream of the plurality of filters, wherein the mixer mixes the incident RF signal with the RF signal from the local oscillator to provide a downconverted signal to the plurality of filters.

6. The sensor as claimed in claim 1, further comprising a second plurality of filters, each allowing passage of signals over a different band of frequencies from the band of frequencies over which passage of signals is allowed by the others of the second plurality of filters, the passbands of the second plurality of filters being different from those of the first plurality of filters, each filter being associated with a detector that generates an output signal if the incident RF signal results in a signal in the band of frequencies passed by the filter with which the detector is associated.

7. The sensor as claimed in claim 6 further comprising a second coarse RF bandpass filter, allowing passage of RF signals over a band of frequencies comprising the bands of frequencies passed by the second plurality of filters.

8. The sensor as claimed in claim 7 further comprising a second local oscillator arranged to provide a RF signal and a second mixer, arranged upstream of the second plurality of filters, wherein the second mixer mixes the incident RF signal with the RF signal from the second local oscillator to provide a downconverted signal to the second plurality of filters, the RF signal provided by the second local oscillator being different from the RF signal provided by the first local oscillator.

9. The sensor as claimed in claim 6, further comprising at least one further set of a plurality of filters and associated detectors, a coarse RF bandpass filter, a local oscillator and a mixer, each arranged substantially as in the first and second sets described above, each set being arranged to detect the incident RF signal over a different range of frequencies.

10. A system comprising an active high-impedance surface and a sensor according to claim 1.

11. A communications system including a sensor according to claim 1.

12. A method of detecting an RF signal and estimating the signal's carrier frequency, the method comprising monitoring for the RF signal with a sensor simultaneously in each of a plurality of frequency bands and, upon detection of the RF signal in one of the monitored frequency bands, generating an output signal indicating in which of the frequency bands the RF signal has been detected, wherein each of the plurality of filters each has a bandpass width of more than 1.5 MHz such that, between arrival of the RF signal at the sensor and generation of the output signal indicating in which of the frequency bands the RF signal has been detected, there is a delay of not more than 1 microsecond.

13. The sensor as claimed in claim 2, further comprising a coarse RF bandpass filter allowing passage of RF signals over a band of frequencies comprising the bands of frequencies passed by the plurality of filters.

14. The sensor as claimed in claim 3, further comprising a coarse RF bandpass filter allowing passage of RF signals over a band of frequencies comprising the bands of frequencies passed by the plurality of filters.

15. The sensor as claimed in claim 2 further comprising a local oscillator arranged to provide an RF signal and a mixer, arranged upstream of the plurality of filters, wherein the mixer mixes the incident RF signal with the RF signal from the local oscillator to provide a downconverted signal to the plurality of filters.

16. The sensor as claimed in claim 3 further comprising a local oscillator arranged to provide an RF signal and a mixer, arranged upstream of the plurality of filters, wherein the mixer mixes the incident RF signal with the RF signal from the local oscillator to provide a downconverted signal to the plurality of filters.

17. The sensor as claimed in claim 4 further comprising a local oscillator arranged to provide an RF signal and a mixer, arranged upstream of the plurality of filters, wherein the mixer mixes the incident RF signal with the RF signal from the local oscillator to provide a downconverted signal to the plurality of filters.

18. The sensor as claimed in claim 2, further comprising a second plurality of filters, each allowing passage of signals over a different band of frequencies from the band of frequencies over which passage of signals is allowed by the others of the second plurality of filters, the passbands of the second plurality of filters being different from those of the first plurality of filters, each filter being associated with a detector that generates an output signal if the incident RF signal results in a signal in the band of frequencies passed by the filter with which the detector is associated.

19. The sensor as claimed in claim 3, further comprising a second plurality of filters, each allowing passage of signals over a different band of frequencies from the band of frequencies over which passage of signals is allowed by the others of the second plurality of filters, the passbands of the second plurality of filters being different from those of the first plurality of filters, each filter being associated with a detector that generates an output signal if the incident RF signal results in a signal in the band of frequencies passed by the filter with which the detector is associated.

20. The sensor as claimed in claim 4, further comprising a second plurality of filters, each allowing passage of signals over a different band of frequencies from the band of frequencies over which passage of signals is allowed by the others of the second plurality of filters, the passbands of the second plurality of filters being different from those of the first plurality of filters, each filter being associated with a detector that generates an output signal if the incident RF signal results in a signal in the band of frequencies passed by the filter with which the detector is associated.

21. The sensor as claimed in claim 1, wherein said detectors are log detectors for generating an output signal from said filter in a form proportional to the amplitude in dB of output of the associated filter for generating a dynamic range greater than 40 dB.

* * * * *